United States Patent [19]

Uezumi et al.

[11] Patent Number: 4,471,281
[45] Date of Patent: Sep. 11, 1984

[54] DIGITAL CONTROL DEVICE

[75] Inventors: Yoshiaki Uezumi, Akashi; Osamu Yamamoto, Kobe; Akira Kaiko, Nara, all of Japan

[73] Assignee: Mitsubishi Denki Kabushiki Kaisha, Tokyo, Japan

[21] Appl. No.: 384,963

[22] Filed: Jun. 4, 1982

[30] Foreign Application Priority Data

Jun. 17, 1981 [JP] Japan .................. 56-94280

[51] Int. Cl.³ .............................................. G05B 1/01
[52] U.S. Cl. .................................. 318/606; 318/607; 318/318
[58] Field of Search ........... 318/607, 318, 317, 345 D, 318/615

[56] References Cited

U.S. PATENT DOCUMENTS

| | | | |
|---|---|---|---|
| 3,408,547 | 10/1968 | Saeger | 318/607 X |
| 4,015,180 | 3/1977 | Tetsugu et al. | 318/318 X |
| 4,271,382 | 6/1981 | Maeda et al. | 318/318 |
| 4,348,622 | 9/1982 | Inoue | 318/318 |

FOREIGN PATENT DOCUMENTS 55-46885  2/1980  Japan .
55-77920  12/1980  Japan .
56-71514  6/1981  Japan .

Primary Examiner—B. Dobeck
Attorney, Agent, or Firm—Wenderoth, Lind & Ponack

[57] ABSTRACT

A digital control device includes a first controller which generates a control reference signal of a first controlled variable of a controlled system, a first frequency converter which converts said control reference signal into pulses of a frequency proportional to a magnitude thereof, a second frequency converter which converts a measured value of a second controlled variable of said controlled system into pulses of a frequency proportional to a magnitude thereof, and a second controller which obtains a difference between the output pulses of said first frequency converter and the output pulses of said second frequency converter and which controls said second controlled variable by using said difference as a control reference value.

3 Claims, 6 Drawing Figures

DIGITAL CONTROL DEVICE

BACKGROUND OF THE INVENTION

The present invention relates to the digitization of a fast closed-loop control having heretofore been practised in an analog operational amplifier.

It has been conventional to use an analog control for the fast closed-loop control employed in a thyristor type Ward-Leonard system, etc. Recently, also a programmed digital control has become possible owing to the rapid progress of microprocessors. This digital control, however, has had the disadvantage that the arrangement of a control system is more complicated than in the analog control.

SUMMARY OF THE INVENTION

The present invention eliminates the disadvantage of the known digital control system, and provides a digital control device comprising a first controller which generates a control reference signal of a first controlled variable of a controlled system, a first frequency converter which converts the control reference signal into pulses of a frequency proportional to a magnitude thereof, a second frequency converter which converts a measured value of a second controlled variable of the controlled system into pulses of a frequency proportional to a magnitude thereof, and a second controller which obtains a difference between the output pulses of the first frequency converter and those of the second frequency converter and which controls the second controlled variable by using the difference as a control reference value.

BRIEF DESCRIPTION OF THE DRAWINGS

All of FIGS. 1, 2, 3 and 6 show block diagrams of thyristor type Ward-Leonard speed controls; in which FIG. 1 corresponds to a conventional analog control system;

FIG. 4 is a block diagram of the internal detailed circuit arrangement of a voltage controller in FIG. 3, while

DESCRIPTION OF THE PREFERRED EMBODIMENTS

Figure 1:
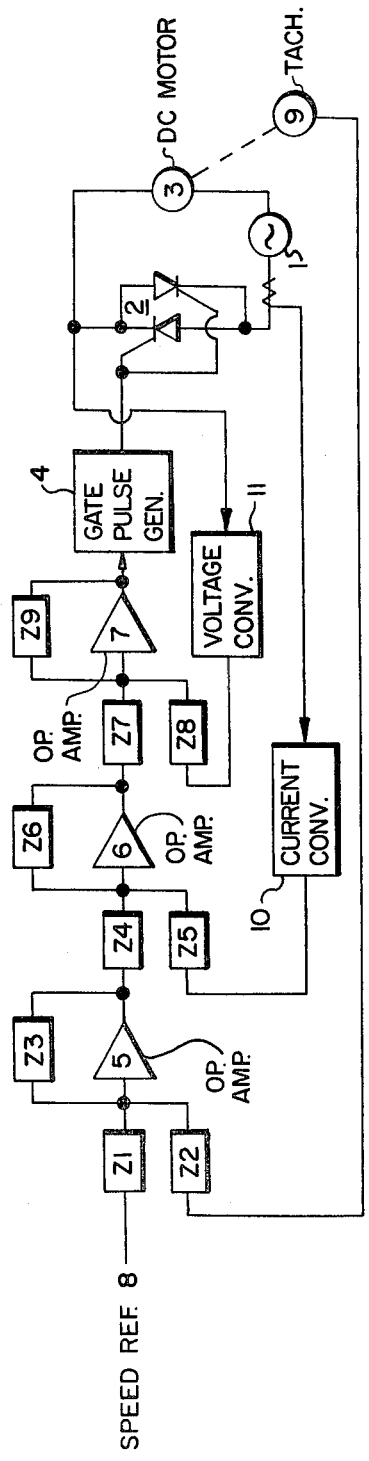

FIG. 1 shows a block diagram of a thyristor type Ward-Leonard speed control based on a conventional analog control system. Referring to FIG. 1, power fed from an A.C. power supply 1 is rectified by thyristors 2 and then drives a D.C. motor 3. The thyristors 2 are triggered by a gate pulse generator 4, and are controlled so that the motor 3 may be supplied with a direct current (first controlled variable) and a D.C. voltage (second controlled variable).

Operational amplifiers 5, 6 and 7 are respectively called a speed controller, a current controller (first controller) and a voltage controller. They are connected in cascade as a whole, and are controlled so that the motor 3 may eventually rotate at a speed conforming with a speed reference value 8. In the figure, $Z_1$-$Z_9$ indicate impedances which are determined from the characteristics of the operational amplifiers and a control theory.

The speed controller 5 compares the reference signal 8 and a feedback signal from a tachometer dynamo 9, and amplifies the difference and then delivers the amplified signal to the current controller 6. The current controller 6 compares the output of the speed controller 5 and a current feedback signal from a main-circuit current converter 10, and amplifies the difference and then delivers the amplified signal to the voltage controller 7. This current controller 6 has two functions, one of which is the function of controlling the current of the main circuit so as to prevent any excess current from flowing therethrough and the other of which is the function of suppressing the rate of change of the main-circuit current so as to prevent the motor 3 from leading to flashover on account of an excess rate of change.

The voltage controller 7 compares the output of the current controller 6 and a voltage feedback signal from a main-circuit voltage converter 11, and amplifies the difference and then delivers the amplified signal to the gate pulse generator 4. This voltage controller 7 is constructed as a first-order lag circuit in view of the control theory, and has two functions. One of them is the elimination of nonlinear characteristics. As the characteristics of the thyristor 2, there is the disadvantage that the main-circuit current is interrupted at a period associated with each cycle of the A.C. power supply 1 in a region of low currents, so the control gain decreases, resulting in a lowered response. Since, in this regard, the voltage controller 7 which is the first-order lag circuit having a high gain is possessed as an internal control loop, the nonlinear characteristics can be compensated to prevent the lowering of the response.

The other function of the voltage controller 7 is the simplification of a change-over circuit. In FIG. 1, the thyristors 2 are operated in two directions, one of which corresponds to an operation called the forward operation or converter operation wherein the A.C. power supply 1 feeds the power to the motor 3, and the other of which corresponds to an operation called the reverse operation of inverter operation wherein the motor 3 returns the power to the A.C. power supply 1. Ordinarily, the converter operation is performed, and a load is driven by the motor. At the time of stop, however, kinetic energy owned by the load is converted into electrical energy by the motor 3 operating as a dynamo, and the latter is returned to the A.C. power supply 1 by the thyristor 2. Accordingly, the reverse operation is also termed the regenerative braking. As explained above, the thyristors have the two, forward and reverse operation modes. As illustrated in the figure, the two operation modes are borne by the respective thyristors separate from each other. Therefore, when the ordinary operation is shifted to the stop, the thyristor element to be triggered needs to be changed-over.

The voltage controller 7 has the beneficial effect of simplifying the change-over function. More specifically, when the voltage controller 7 is put into the form of the controller having the high gain but exhibiting the first-order lag, in other words, the controller of the P-type (proportional type), detection for the change-over can be performed by utilizing the steady deviation phenomenon peculiar to the P-type controller. The reason is that, in case the output of the current controller 6 and the voltage feedback signal of the output from the main-circuit voltage converter 11 are compared in the arrangement of FIG. 1, a slight deviation is always existent, and that the polarity of the deviation is reversed in the forward operation and the reverse operation. Accordingly, when the output signal of the voltage controller 7 is observed, its polarity is similarly reversed in the forward operation and the reverse operation. Therefore, the change-over between the thyristors 2 taking charge of the two, forward and reverse directions can be smoothly effected without hindrance merely by disposing a polarity discriminator circuit, not shown in FIG. 1, on the output side of the voltage controller 7 and changing-over the thyristors 2 in accordance with the discrimination of this circuit. Accordingly, a complicated change-over logic circuit is not separately required. This is one of great advantages attained by the introduction of the voltage controller 7.

The foregoing is the explanation of the analog control system which has been practised since a time prior to the advent of a digital control applying a microprocessor. The analog control system has been exemplified as to the case where the speed control having the closed loop controls of the voltage control and the current control therein is adopted.

Figure 2:
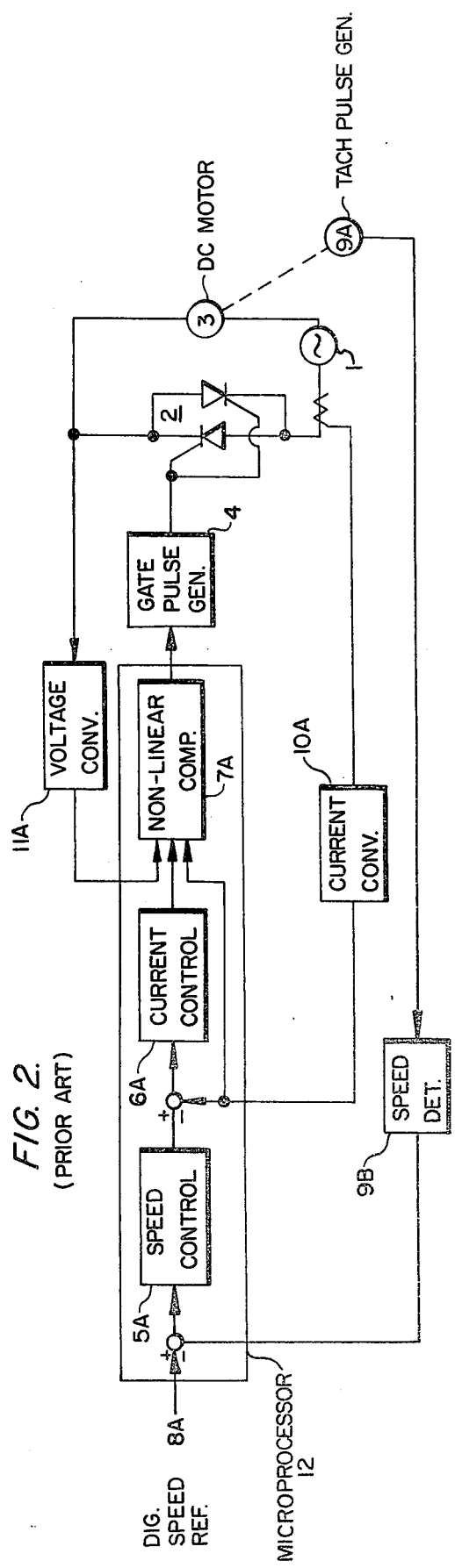
FIG. 2 is a present-day programmed digital control system.

On the other hand, a speed control based on the programmed digital control practised at present has its block diagram shown in FIG. 2.

In place of the group of operational amplifiers in FIG. 1, the microprocessor 12 indicated by the so labeled block in FIG. 2 is disposed so as to execute the programmed control. Shown at 5A, 6A and 7A in the figure are parts related to FIG. 1 by functionally dividing the program. 5A indicates the speed control function, 6A the current control function, and 7A the nonlinear characteristics-compensating function.

A digitized speed reference signal 8A is compared with an output from a speed detector 9B which provides a digital value corresponding to a speed by counting and processing pulses generated from a tachometer pulse signal generator 9A. The resulting signal is processed and then delivered to the current control function 6A by the speed control function 5A. The current control function 6A compares the output from the speed control function 5A and an output from a current converter 10A which converts a main-circuit current into a digital value, and it processes the difference and delivers the resulting signal to the nonlinear characteristics-compensating function 7A.

The nonlinear characteristics-compensating function 7A monitors the output of the current converter 10A, and during the interruption of the current, it alters the control gain in dependence on the operating state at that time, so as to prevent the lowering of responsibility based on the nonlinear characteristics peculiar to the thyristors 2. In order to monitor the operating state, the output from the current converter 10A and an output from a voltage converter 11A which converts a main-circuit voltage into a digital value are introduced into the nonlinear characteristics-compensating function 7A, and the output from the current control function 6A is further taken into consideration so as to adjust the control gain. Thus, an output for controlling the gate pulse generator 4 having the same function as in FIG. 1 is produced.

The foregoing is the explanation of the digital control system applying the microprocessor as has hitherto been practised. The digital control system has been exemplified as to the case of adopting the speed control.

Thus far, there have been described the conventional analog control system employing the operational amplifiers and the programmed digital control system employing the microprocessor. While both the systems are equivalent in point of the response of the speed control, the digital control system is much better in points of the control precision and the capability of processing the control information within the control system. In the future, therefore, the thyristor type Ward-Leonard system based on the digital control system will form the mainstream especially in fields requiring high precisions.

As the disadvantage of the present-day digital control system, however, there is mentioned the nonexistence of a function equal to that of the voltage controller 7 for controlling the second controlled variable in the analog control system of FIG. 1. The corresponding function is the nonlinearity compensating function 7A in FIG. 2, but this compensating function 7A is, after all, a control based on an open loop and does not effect the closed loop control as in the voltage controller 7 in FIG. 1.

The aforementioned circumstances are unavoidable with presently available microprocessors. The analog control system in FIG. 1 has attained a control response which affords a cutoff frequency of approximately $\omega_c - 1000$ radians/sec. When it is intended to achieve a response equivalent thereto by a sampling control based on the programmed digital control system, it is technically required that the main-circuit voltage being the feedback signal is digitized every approximately 200–300 $\mu$sec and that the voltage control function which is performed by employing the average value of the several digital values as a feedback signal is carried out every approximately 800–1000 $\mu$sec. However, any microprocessor meeting such severe requirements satisfactorily is not existent at all, and it cannot be expected in near future.

Accordingly, the sampling period is altered and greatly extended to the degree which can be fully coped with by a presently available microprocessor, whereupon the nonlinearity compensating function 7A based on the open loop is added.

Since, however, the compensating function 7A is the open loop control, an exact compensation is impossible unless all the electrical constants such as the characteristics of the thyristors 2 and the resistance component and inductance components of the motor 3 are fully known. More specifically, from the standpoint of the manufacturer of the device, a troublesome problem lacking reproducibility is involved in such a manner that the electrical constant values of the motor 3 to be driven needs to be measured one by one or that the test of the combination between the thyristor bridge and the motor is needed at all times. On the other hand, from the standpoint of the user of the device, the maintenance is inconvenient in such a manner that when the motor has been replaced, compensation conditions need to be reset. In contrast, in the conventional analog control system shown in FIG. 1, the voltage controller 7 is the closed loop control system. Therefore, the control gain is determined by only a one-round gain decided by the impedances $Z_8$ and $Z_9$, the gate pulse generator 4, the thyristors 2 and the main-circuit voltage converter 11, and it is unrelated to the electrical constant values of the motor 3. In this respect, accordingly, the conventional analog control system has been convenient. Further, for the change-over of the thyristors 2 in charge from the forward direction to the reverse direction, or vice versa, the present-day programmed digital control system shown in FIG. 2 requires a complicated change-over logic function independent of the nonlinearity compensating function 7A. The reasons are as follows. In the conventional analog control system shown in FIG. 1, a command signal for the change-over can be formed merely by discriminating the polarity of the output of the voltage controller 7 executing the closed loop control, whereas in the digital control system shown in FIG. 2, the function 7A is the open loop control function and therefore have no comparing and discriminating function. Further, since a high-speed response is required, the change-over must be considered quite separately.

As apparent from the above description, the disadvantages of the present-day digital control system are that while the voltage controller having attained the greatest effect in spite of the simple arrangement in the conventional analog control system, i.e., the closed-loop internal voltage control function is abandoned in relation to the capability of the microprocessor being a used element, the complicated open-loop control function of the nonlinearity compensating function must be inevitably introduced in order to maintain the corresponding function required technically, and that the change-over circuit for the forward and reverse directions is required independently of the aforementioned function.

This invention has been made in order to eliminate the disadvantages of the present-day digital control system as described above, and has for its object to provide a fast response type digital control device in which a digital controller evaluating a pulse difference is introduced, whereby the controller for controlling the second controlled variable can be put into the closed-loop internal control loop as in the conventional analog control system.

Figure 3:
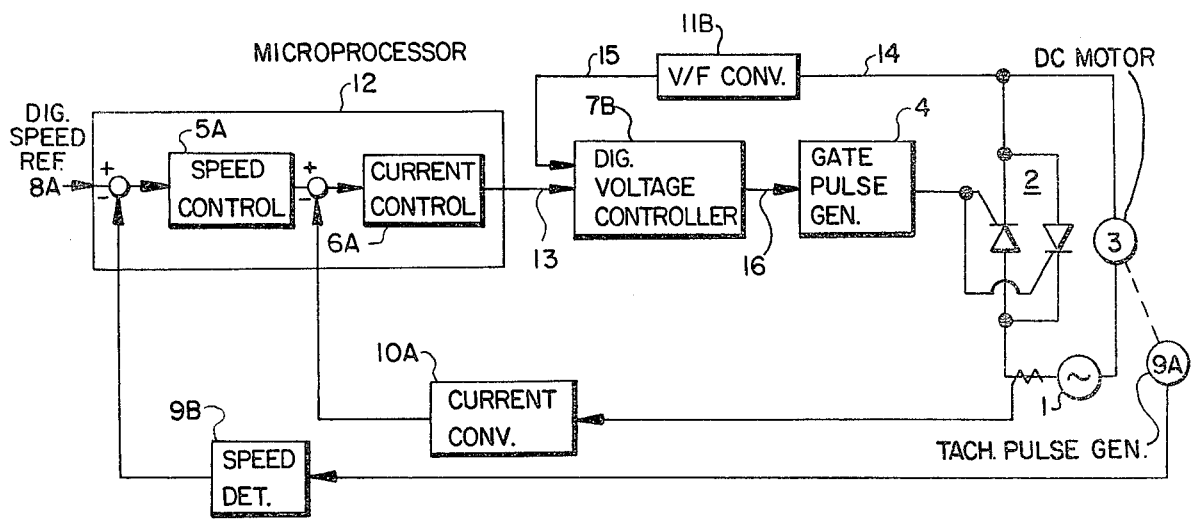
FIG. 3 is one embodiment of the present invention.

One embodiment of the present invention will be described with reference to FIGS. 3 and 4. FIG. 3 shows a block diagram of the thyristor type Ward-Leonard speed control as corresponds to FIG. 2. In FIG. 3, the block 12 encloses the elements in which the microprocessor 12 takes charge. In the figure, it is as in FIG. 2 that 5A indicates the speed control function, while 6A indicates the current control function. Further, the respective functions of the A.C. power supply 1, thyristors 2, D.C. motor 3, gate pulse generator 4, digitized speed reference signal 8A, tachometer pulse signal generator 9A, speed detector 9B and the current converter 10A are quite the same as in the present-day digital control system shown in FIG. 2. Accordingly, the first controller 6A for the current control delivers a digitized control output 13 to the digital voltage controller indicated at 7B in the figure. The second controller 7B for the voltage control is an independent digital control circuit which is incorporated in order to effect quite the same control function as that of the voltage controller 7 in the conventional analog control system shown in FIG. 1.

A main-circuit analog voltage signal 14 is converted by a voltage-to-frequency converter (V/F converter) 11B into a train of pulses 15 whose frequency is proportional to a main-circuit voltage. The train of pulses 15 are applied to and processed by the voltage controller 7B, whereby a digitized control output 16 for the gate pulse generator 4 is produced.

Figure 4:
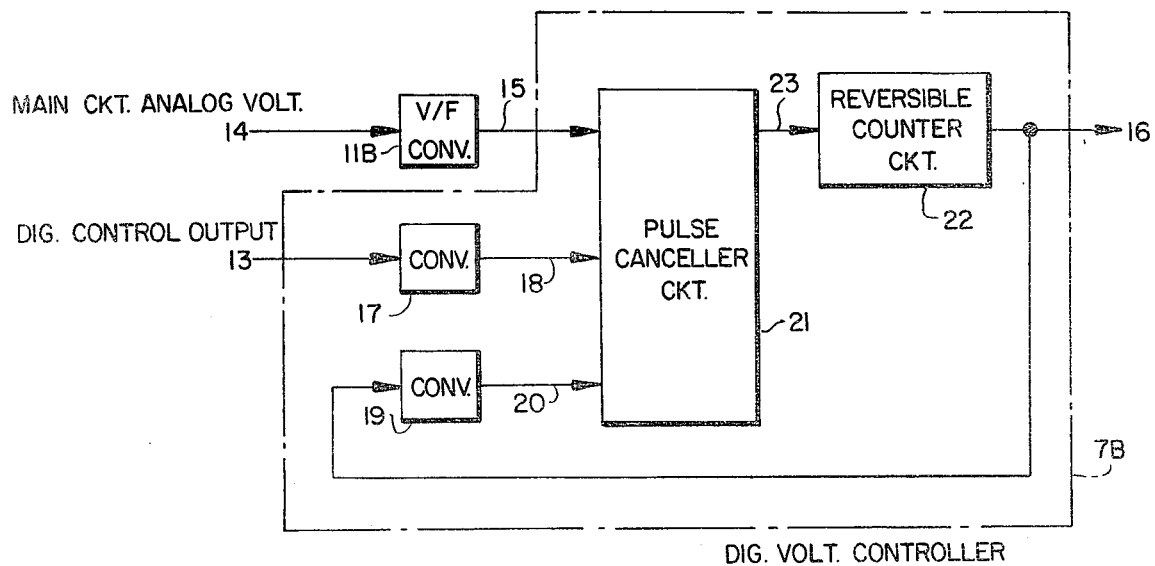

FIG. 4 shows a block diagram of the internal detailed circuit of the voltage controller 7B in FIG. 3, along with the voltage-to-frequency converter 11B.

Figure 5:
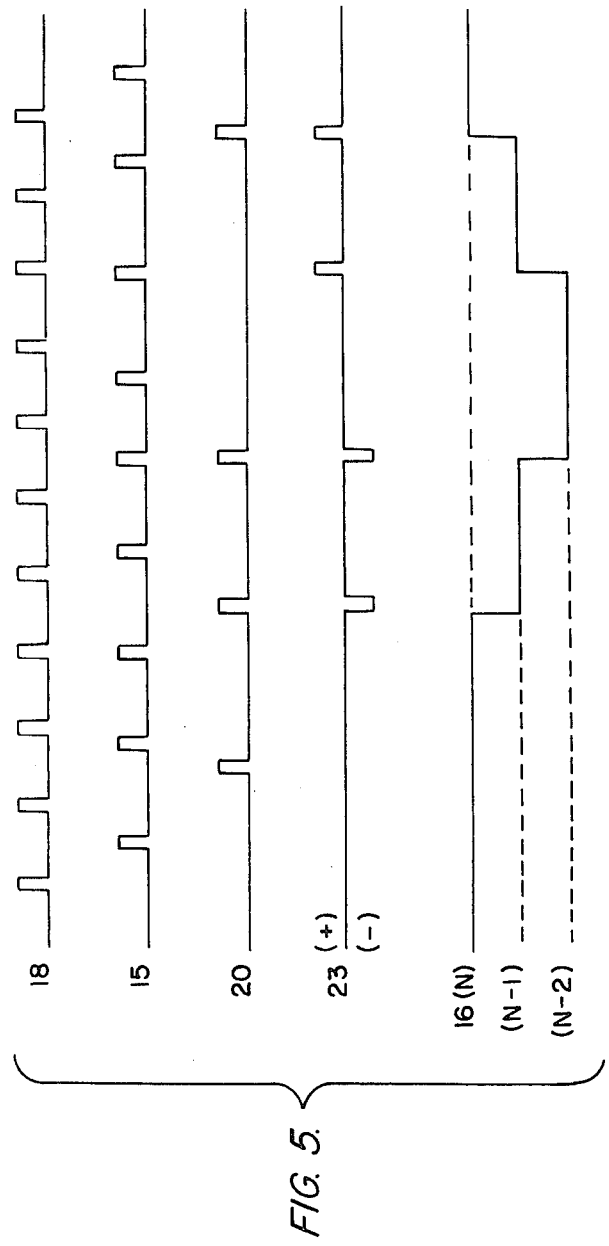
FIG. 5 is an explanatory diagram showing an example of the operation of the circuit arrangement in FIG. 4.

Referring to FIG. 4, the digitized control output 13 which the current control function 6A in FIG. 3 is converted by a converter 17 into a train of pulses 18 whose frequency is proportional to the digital value. Also the control output 16 of the voltage controller 7B is converted by a converter 19 into a train of pulses 20 whose frequency is proportional to the control output. Numeral 21 designates a pulse canceller circuit, which generates a train of counting-up or counting-down input pulses 23 to a reversible counter circuit 22. The pulse canceller 21 receives the train of pulses 18 as count-up pulses and the trains of pulses 15 and 20 as count-down pulses and cancels the adjoining count-up pulses and count-down pulses from each other, whereupon it delivers the remainder as the train of pulses 23. An example of the operation of the pulse canceller is illustrated in FIG. 5, together with the output 16 of the reversible counter 22. In FIG. 5, numerals 15, 18, 20 and 23 indicate pulse train signals of the corresponding parts in FIG. 4, respectively. The pulse train signal 23 in FIG. 5 is exemplified as being provided in the positive direction for upcounting and in the negative direction for downcounting. However, the method of cancelling the pulses is not restricted to only the example of this figure. The output 16 of the reversible counter 16 is so illustrated that its initial value is an integral value N.

Next, the operation of the voltage controller 7B will be explained with mathematical expressions by grasping it as the relationship of the output 16 to the inputs 13 and 14 in FIG. 4. Now, the following is supposed:

$$\left.\begin{array}{l} \text{Digital value of signal } 13 = x_{13} \\ \text{Analog value of signal } 14 = x_{14} \\ \text{Digital value of signal } 16 = x_{16} \end{array}\right\} \quad (1)$$

As explained on the group of converters 11B, 17 and 19, the frequencies $f_{15}$, $f_{18}$ and $f_{20}$ of the respective pulse train signals 15, 18 and 20 are indicated by the following expressions:

$$\left.\begin{array}{l} f_{15} = a_{14} \cdot x_{14} \\ f_{18} = a_{13} \cdot x_{13} \\ f_{20} = a_{16} \cdot x_{16} \end{array}\right\} \quad (2)$$

Accordingly, the frequency $f_{23}$ of the pulse train signal 23 after having passed through the pulse canceller 22 is indicated by the following expression:

$$\begin{aligned} f_{23} &= f_{18} - f_{15} - f_{20} \\ &= a_{13} \cdot x_{13} - a_{14} \cdot x_{14} - a_{16} \cdot x_{16} \end{aligned} \quad (3)$$

In Expression (3), the plus sign of the value of $f_{23}$ denotes upcounting, and the minus sign of the same denotes downcounting. In addition, $$f_{23} = 0 \quad (4)$$

indicates that the pulse train signal 23 is in the no-signal state.

Next, the change of the output $x_{16}$ of the reversible counter 22 per unit time is equal to the frequency of the inputted pulse train signal 23. Therefore, the following expression holds:

$$\dot{x}_{16} = f_{23} \quad (5)$$

The above expressions (1)–(5) are arranged as the relationship among $x_{13}$, $x_{14}$ and $x_{16}$, as follows:

$$\dot{x}_{16} + a_{16} \cdot x_{16} = a_{13} \cdot x_{13} - a_{14} \cdot x_{14} \quad (6)$$

By performing the Laplace transform, $$\left. \begin{array}{l} x_{16} = \dfrac{1}{1 + S \cdot T_a} \cdot \dfrac{a_{13} \cdot x_{13} - a_{14} \cdot x_{14}}{a_{16}} \\ \text{where } T_a = 1/a_{16} \end{array} \right\} \quad (7)$$

Accordingly, the circuit shown in FIG. 4 operates as a first-order lag circuit, and this is quite equivalent to the operation of the voltage controller 7 in the conventional analog control system shown in FIG. 1. Therefore, the "nonlinear characteristics compensation" and the "simplification of the change-over between the forward and reverse directions" which have been the features of the voltage controller in the conventional analog control system can be held as they are.

Further, all of the V/F converter 11B, variable frequency generators 17 and 19, pulse canceller 21 and reversible counter 22 which are the constituents in FIG. 4 are readily available with the present-day technology even when the cutoff frequency $\omega_c \approx 1000$ radians/sec required for the voltage controller is taken into consideration. Merely by combining these elements, accordingly, there is attained the advantage that the complicated nonlinearity compensating function and change-over circuit peculiar to the present-day digital thyristors can be removed.

Figure 6:
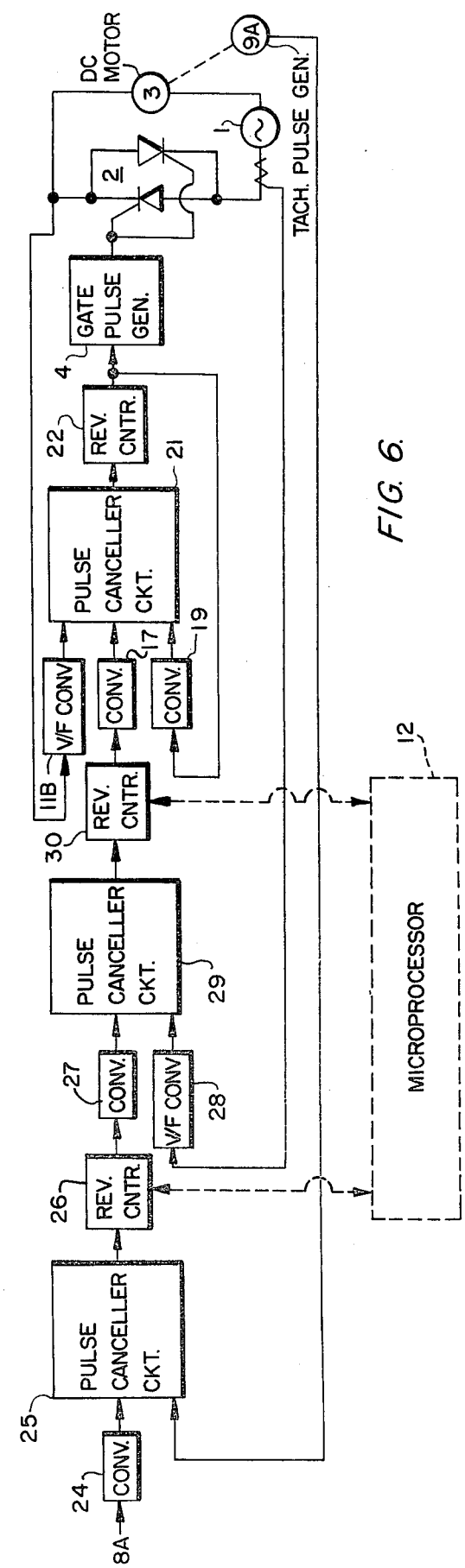
FIG. 6 is another embodiment of the present invention.

Now, another embodiment of the present invention will be described. FIG. 6 shows a block diagram of a device in which, besides the voltage controller illustrated in FIGS. 3 and 4, a speed controller and a current controller are constructed by the use of the pulse cancellation system. In FIG. 6, as in FIG. 3, numeral 1 designates the A.C. power supply, numeral 2 the thyristors, numeral 3 the D.C. motor, numeral 4 the gate pulse generator, symbol 9A the tachometer pulse signal generator, symbol 11B the V/F converter, numerals 17 and 19 the circuits for converting digital values into pulse frequencies, numeral 21 the pulse canceller, and numeral 22 the reversible counter.

In addition, the digitized speed reference signal 8A is converted into a pulse train signal by a pulse converter circuit 24, and the comparison of the pulse train signal with the actual-speed pulse train signal from the tachometer pulse signal generator 9A is made by a pulse canceller circuit 25 as well as a reversible counter circuit 26. That is, the circuits 24, 25 and 26 correspond to the speed controller 5 in FIG. 1.

Subsequently, a digital value being the output of the counter 26 is converted into a pulse train signal by a pulse converter circuit 27, and the comparison of this pulse train signal with the output of a V/F converter 28 which converts an actual current value into a pulse train signal is made by a pulse canceller circuit 29 as well as a reversible counter 30. That is, the circuits 27, 28 and 29 correspond to the current controller 6 in FIG. 1. The processing of an output signal from the counter 30 is quite the same as in FIGS. 3 and 4.

Numeral 12 indicates the microprocessor which is optionally disposed in correspondence with special controls other than the standard controls, for example, the nonlinear control etc. It is interfaced with the counters 26 and 30, and it corrects the content values of the counters 26 and 30 as may be needed.

That is, in this embodiment, the microprocessor which is expensive and which is difficult of handling is dispensed with as to the standard controls and is used only for the special controls, so that the control device can be constructed inexpensively. In case of using the microprocessor, the control device has an operating margin as compared with the example of FIG. 2 or FIG. 3 which executes the internal closed loop controls such as the speed control and current control by directly using the microprocessor, and hence, it is possible to enrich functions such as the control information processing which can be performed only by the microprocessor.

In the foregoing two embodiments the thyristor type Ward-Leonard system which drives the D.C. motor has been the controlled system. The controlled system, however, it not restricted to the thyristor type Ward-Leonard system, but the invention is also applicable to a VVVF-power supply for driving an A.C. motor and in general, all control functions employing analog operational amplifiers. Especially, the control circuit collectively packaged as shown in FIG. 4 can completely replace the conventional analog controller, and it is thought to be usable conveniently.

As set forth above, according to this invention, the digital controller applicable to the closed-loop control function operating at high speed is constructed by combining the pulse canceller, the reversible counter and the frequency converter. The invention therefore achieves the effects that the fast closed-loop controls of the thyristor type Ward-Leonard system etc. can be digitized whilst holding the features of the conventional analog control and that the controls of high precision can be performed inexpensively and simply.

What is claimed is:

1. A digital control device comprising a first controller which generates a control reference signal of a first controlled variable of a controlled system, a first frequency converter which converts said control reference signal into pulses of a frequency proportional to a magnitude thereof, a second frequency converter which converts a measured value of a second controlled variable of said controlled system into pulses of a frequency proportional to a magnitude thereof, and a second controller which obtains a difference between the output pulses of said first frequency converter and the output pulses of said second frequency converter and which controls said second controlled variable by employing said difference as a control reference value; wherein said second controller comprises a pulse canceller circuit which subtracts said output pulses of said frequency converter from said output pulses of said first frequency converter and which feeds back the resulting difference and subtracts it from said output pulses of said first frequency converter.

2. A digital control device according to claim 1, wherein said controlled system is a thyristor circuit which drives a motor.

3. A digital control device according to claim 2, wherein said first controlled variable is a current, while said second controlled variable is a voltage.

* * * * *